United States Patent [19]

Bush et al.

[11] 3,736,587
[45] May 29, 1973

[54] COHERENT FREQUENCY HOPPED, PHASE MODULATED ACOUSTIC SURFACE WAVE GENERATOR

[75] Inventors: Henry J. Bush, Rome; John N. Entzminger, Jr., Clinton; Walter R. Richard, Herkimer, all of N.Y.

[73] Assignee: The United States of America as represented by the Secretary of the Air Force, Washington, D.C.

[22] Filed: May 26, 1971

[21] Appl. No.: 147,048

[52] U.S. Cl.................340/351, 179/1.5 E, 325/32, 333/72
[51] Int. Cl. .............................................G08c 1/00
[58] Field of Search....................340/351; 179/1.5 E; 333/72; 325/32, 33, 34

[56] References Cited

UNITED STATES PATENTS 3,337,803  8/1967  Costas et al. ..........................325/32
2,926,217  2/1960  Powell ..............................179/1.5 E
3,411,089  11/1968  Gicca..................................179/1.5 E
3,479,572  11/1969  Pokorny................................333/72

OTHER PUBLICATIONS

IEEE Spectrum, Aug. 1971, pp. 22–35, Kino et al., "Signal Processing in Acoustic Surface Wave Devices".

Primary Examiner—john W. Caldwell
Assistant Examiner—Robert J. Mooney
Attorney—Harry A. Herbert, Jr. and William Stepanishen

[57] ABSTRACT

An apparatus utilizing an acoustic surface wave having an ordered-code form to provide bi-phase modulation of an electromagnetic carrier frequency. A continuous stream of coded sequences is generated by utilizing a tapped delay line as a sequence generator in conjunction with a shift register which is actuated by an adjustable reference code.

4 Claims, 12 Drawing Figures

Patented May 29, 1973

INVENTORS
HENRY J. BUSH
JOHN N. ENTZMINGER, JR.
BY WALTER R. RICHARD

Harry A. Herbert Jr.
William Stepanishen
ATTORNEYS

INVENTORS.
HENRY J. BUSH
JOHN N. ENTZMINGER, JR.
BY WALTER R. RICHARD

ATTORNEYS

COHERENT FREQUENCY HOPPED, PHASE MODULATED ACOUSTIC SURFACE WAVE GENERATOR

BACKGROUND OF THE INVENTION

The present invention relates broadly to an acoustic surface waveform generator and in particular to an apparatus for generating a phase modulated, phase coherent frequency hopping waveform.

In present day communication systems, the use of frequency-hopping spread spectrum signals is wide spread. Prior art devices, such as a cryptographic key generator, are utilized as pseudo-random information sources to provide an input into frequency-hopping spread spectrum communication systems. However, these prior art communication systems encounter problems in the areas of modulation, timing and synchronization in order to maintain intelligible communication between transmitters and receivers. Further, the phase difference between a received waveform from a distant generator and a properly synchronized local generator is proportional to the distance which separates them. In the case of a frequency hopping signal, the accuracy to which this may be determined is proportional to the bandwidth over which the hopping occurs. The present invention provides a method of generating phase modulated waveforms which may be rapidly hopped over large bandwidths. The coherency of the generators provides a simple means by which the phase differences may be measured and the use of the large bandwidth provides the required accuracy.

SUMMARY OF THE INVENTION

The present invention utilizes the acoustic surface wave phenomena to generate phase coherent, frequency hopped waveforms which are phase modulated. Multiple tap acoustic surface wave delay lines and switching logic are arranged to generate pseudo-random phase modulated sequences. A frequency hopped synthesizer is established by arranging in parallel a group of delay lines, each of which delay lines being resonant at a different frequency and by utilizing switching logic circuitry to synthesize the desired waveform. Each frequency will be pseudo-randomly phase modulated. Since the phase of a surface wave and its coupled electrical signal may be accurately predicted for given input conditions, the frequency hopping is phase coherent. Thus, there is zero phase difference between synthesizers as the frequency is pseudo-randomly hopped.

It is one object of the invention, therefore, to provide an acoustic surface wave generator apparatus to generate phase modulated, phase coherent frequency hopping waveforms.

It is another object of the invention to provide an acoustic surface wave generator apparatus having zero phase difference between two frequency generators with identical inputs as the frequency hopping progresses in a pseudo-random manner.

DESCRIPTION OF PREFERRED EMBODIMENT

Figure 1:
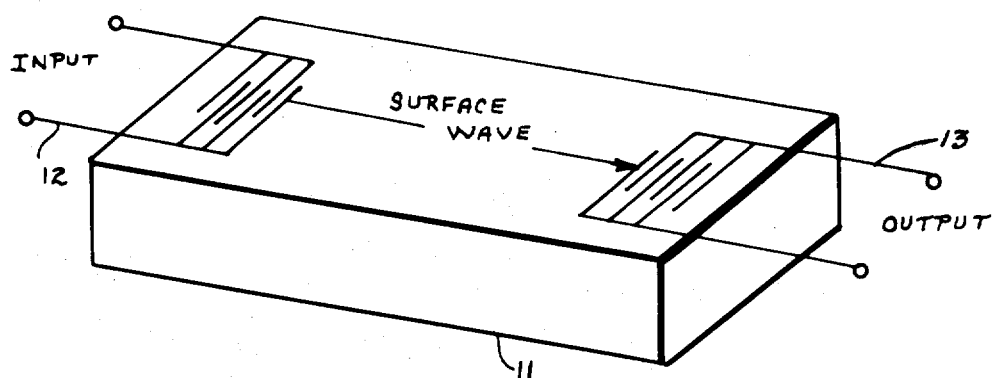
FIG. 1 is illustrated as an acoustic surface wave delay line utilized in the present invention.

Referring now to FIG. 1, there is shown an acoustic surface wave delay line 10 which is utilized in the present invention. The acoustic surface wave delay line 10 comprises a piezoelectric substrate 11, input transducer 12, and output transducer 13.

The transducers 12, 13 are composed of metal which is deposited on the piezoelectric substrate 11 in the form of a finger pattern as shown. The fingers are alternately connected to one of two common lines which lead to the terminals of the port. This type of transducer is called an interdigital transducer because of the finger like pattern. An incoming electric signal will be set up a time varyng electric field pattern between the fingers of the transducer. Because of the properties of piezoelectric materials, this time varying field will couple into the substrate as a material or acoustic wave. The particle motion is confined to within one wavelength of the surface and a surface acoustic wave (Rayleigh wave) travels outward in both normal directions to the transducer. Since the only wave of interest is the one which travels between the transducers, acoustic absorbing material is usually placed on each end of the piezoelectric slab to absorb the unwanted wave.

A group of two fingers which are connected to opposite common lines is called a finger pair. Each of the transducers 12, 13 in FIG. 1 consists of three finger pairs. The centr frequency at which the transducer is to operate determines the width of the finger and the spacing between fingers. Let us define $\lambda_o$ = acoustic surface wave wavelength
$f_o$ = frequency of operation
$V_s$ = acoustic surface wave velocity Then $$\lambda_o = V_s/f_o$$

The surface wave velocity, $V_s$, is generally 95 percent of the bulk shear wave velocity in the same direction of propagation. For operation at a frequency $f_o$, the width of each finger is $\lambda_o/4$ and the spacing between fingers is $\lambda_o/4$. If N is the number of finger pairs in the transducer and $K^2$ is the effective electromechanical coupling constant, then the optimum number of finger pairs is given by $$N = (\pi/4K^2)\ 1/2$$

and the optimum bandwith $B = (4K^2/\pi)1/2$
Thus, the percentage bandwidth is the inverse of the number of finger pairs.

Figure 2:
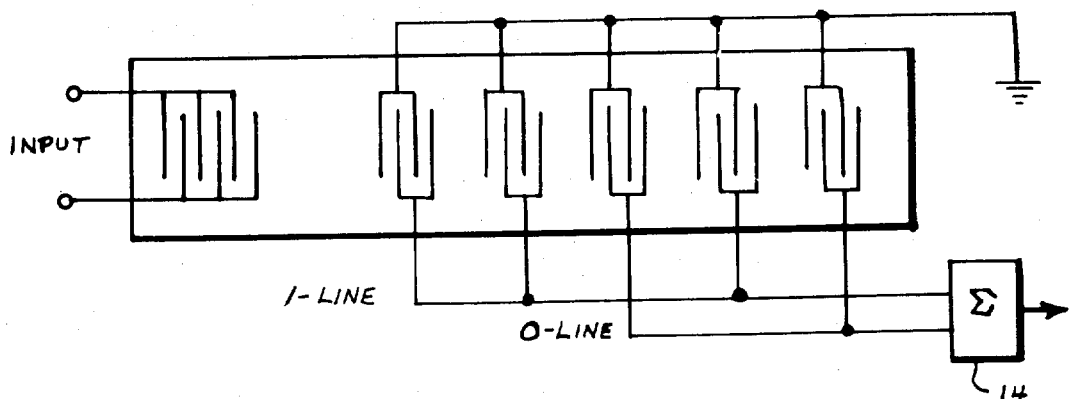
FIG. 2 is a schematic diagram of a tapped acoustic surface wave delay line.

Surface waves possess some desirable characteristics for signal processing functions. Since acoustic surface wave materials are usually non-dispersive, the surface wave is an exact phase replica of the electrical input signal. In addition, since the wave travels on the surface of the piezoelectric slab, taps may be placed along the path to sample or probe the wae without causing any disturbance. Such a tapped delay line is illustrated in FIG. 2.

This arrangement finds its major application to matched filter functions for bi-phase modulated signals. Since acoustic surface wave velocities are approximately five orders of magnitude smaller than the velocity of light, the wavelength of an acoustic surface wave is five orders of magnitude smaller than an electromagnetic wave of the same frequency. This allows the correlation and synchronization of long codes with physically small acoustic surface wave matched filters.

A five bit bi-phase modulated code is shown in FIG. 3. Bi-phase modulation is a process of encoding a carrier wave with information in the form of 180° shift's of the carrier's phase. The digital form is shown in 3(a), the waveform in 3(b) and the phase changes in 3(c). If such a waveform is entered into the input transducer of a tapped delay line, such as in FIG. 2, the same type of acoustic wave will propagate down the delay line. Once the complete code is on the delay line, each cycle will be laying underneath one of the taps and will excite an electrical signal in the tap. The phase of the signal excited in the tap will be the same as that of the surface wave beneath it. According to the code, each tap is connected to either the 1-line or 0-line. The signals in these lines are added in the summing network 14. Summing unit 14 shown at the output of the tape delay line may be a transformer of the type shown and described on page 65 of the text of Millman and Taub. If the input signal has been properly coded, the output from the summer 14 is a correlation peak as illustrated in FIG. 3(d). If the input signal is coded in any other way, the outputs from the taps will not be properly phased and no correlation peak will be obtained. Since the taps of the delay line are set up to match only one coded waveform, this device is called a matched filter.

An interesting property of the surface wave tapped delay line is that it is reciprocal in operation. That is, the tapped delay line may be used to generate the coded sequence. If the electromagnetic signal to the input transducer is a pulse of energy, a surface wave pulse will travel down the delay line. Through the piezoelectric coupling, a signal will be excited in each tap as the acoustic pulse travels beneath it. The number of cycles in the surface wave is equal to the number of finger pairs in the input transducer. Since the taps are equally spaced, the phase of the signal excited in the taps will be the same. By placing a phase inverter in the 0-line, the output of the summer will be a bi-phase modulated waveform. The same effect could be obtained by using, as the input signal, a single cycle of rf or square wave pulse whose spectrum contains the design frequency.

Figure 3A:
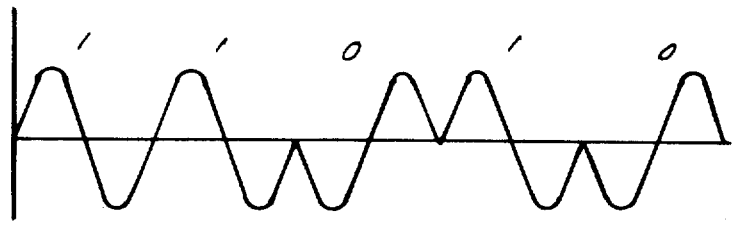
FIG. 3 is a graphical representation of the waveforms utilized and generated in the present invention.
Figure 3B:
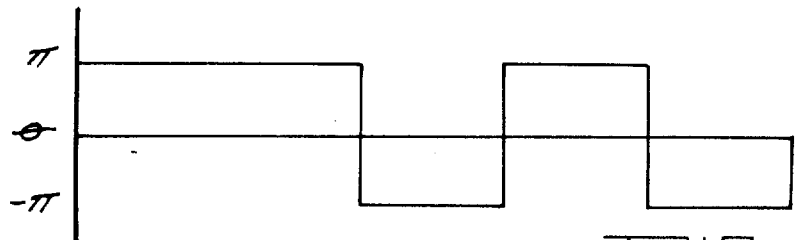
Figure 3C:
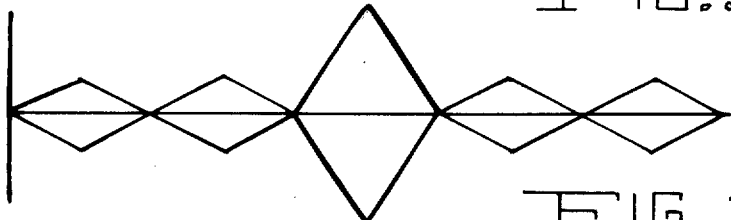
Figure 3D:
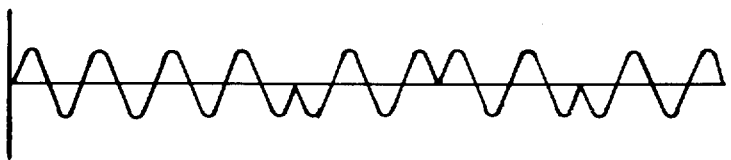

In the above discussion, a single cycle has been used for each bit of the code. It should be noted that any integral number of wavelengths can be used to represent each bit. FIG. 3(e) shows a code with two wavelengths per bit. If the carrier frequency, $f_o$, is $$f_o = 100 \text{ MHz}$$

and the bit rate, $f^1$, is $$f^1 = 10 \text{ MHz}$$

then the number of wavelengths per bit, $N_c$, is $$N_c = f_o/f^1 = 10 \lambda\text{'s/bit}$$

It is still possible to use one or two finger pairs to detect each bit — that is one or two finger pairs per tap. Now each tap must be separated by 10 wavelengths. In general then, the separation between taps must be $$d = N_c \times \lambda$$

The tapped delay lines or matched filters discussed above are called fixed matched filters. They will only correlate the specific code for which they have been wired. Conversely, they will only generate the one coded waveform for which they have been wired. However, through the use of switching logic, it is possible to develop switchable matched filters or switchable frequency generators.

Figure 4:
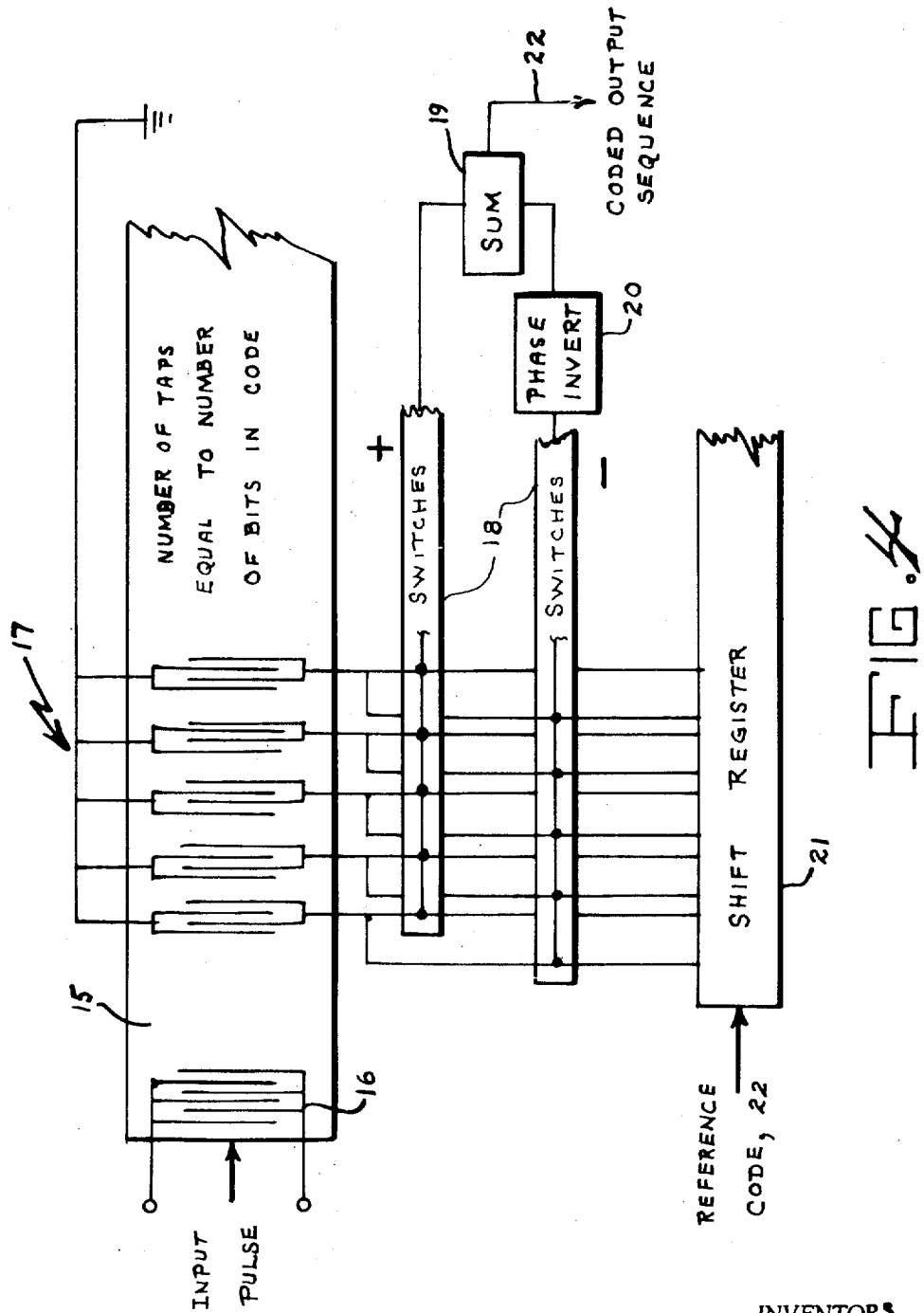
FIG. 4 is a schematic diagram of a switchable sequence generator.

Turning now to FIG. 4, the switchable sequence generator comprises a piezoelectric substrate 15, an interdigital input transducer 16 and a number of output taps 17. The number of taps is equal to the number of bits in the desired coded sequence. The coding will be in the form of biphase modulation of the carrier frequency. One side of each tap is connected to ground. The other side of each tap is connected to two separate rows of switches 18. The switches 18 are single pole double throw switches which may be implemented by dual transistor chips model No. Di3424 which are manufactured by Dionics Inc. One row of switches represents the plus line and the other row the minus line. The two rows are connected to the summing network 19. The minus line feeds into a phase inverter 20 before entering the summer 19. The state of each switch (either opened or closed) is controlled by the shift register 21. The shift register 21 is a serial in/parallel out shifting register of the type shown in Millman and Taub, section 9–13, pages 345–347. This shift register is shown in particular in FIG. 9–41 of the same reference. A reference code 22 is fed into the shift register 21. The output of each stage of the shift register sets the states of the two switches 18 so that the phase of the respective tap corresponds to the phase of the bit stored in the shift register 21. An input pulse or single cycle of the design frequency is fed into the input transducer 16. An acoustic surface wave travels down the delay line and excites signals in each tap 17. Depending upon which of the switches is closed, the signal is routed to either the plus line or the minus line. If the signal is directed to the minus line, it undergoes a phase reversal of 180° in passing through the inverter 20. The inverter 20 is an inverter transformer which is shown in Millman and Taub on page 68 in FIG. 3–4. The output 22 of the summer 19 is the desired pseudo-random phase modulated waveform. The summer 19 is the same as summer 14 which is shown in FIG. 2. The frequency of the output waveform is the resonant frequency of the input transducer 16. Once the coded sequence appears at the output 22, the switches 18 may be re-set to provide a new code by feeding a new reference code into the shift register 21 and pulsing the input transducer 16 again. By utilizing suitable timing, this process may be carried out to provide a continuous stream of coded sequences. It is possible to change the switches for a particular tap immediately after the surface wave has passed. This allows the generator to produce another code without delay.

Pseudo-random phase shifts appear to be completely random fluctuations of phase. However, these shifts are predictable and may be decoded to provide the information. Frequency hopping is a process by which the frequency of the carrier wave is changed after specified periods of time. This process is usually carried out in a pseudo-random manner to prevent interception. Coherent frequency hopping is the generation of frequencies such that two generators or synthesizers with identical inputs will maintain a phase difference of zero as the hopping progresses in a pseudo-random manner. That is, as the frequency of the carrier changes due to the hopping, the phase of each new frequency is predictable.

Figure 5:
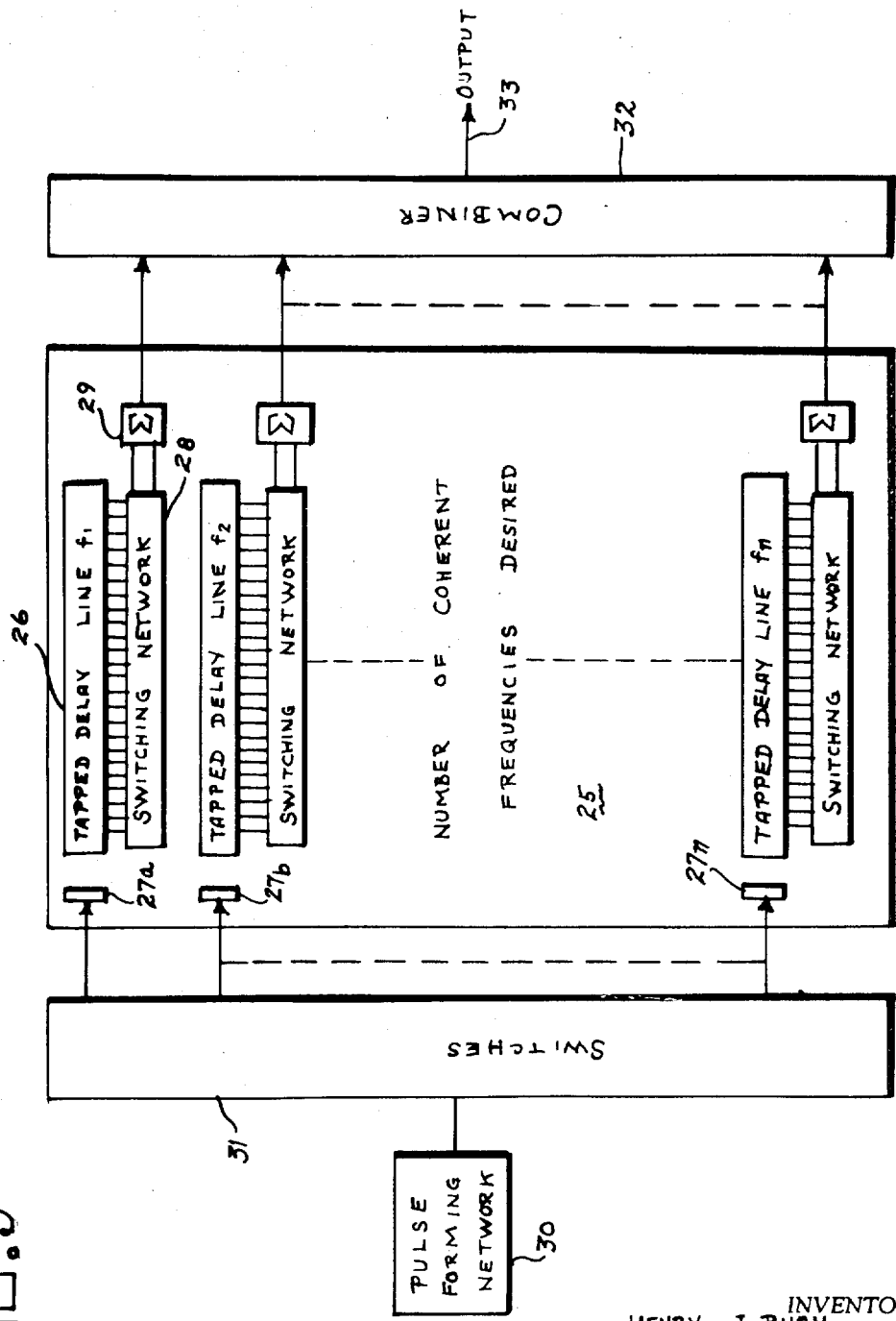
FIG. 5 is a schematic diagram of the preferred form of switchable sequence generator in accordance with this invention.

FIG. 5 illustrates a switchable sequence generator to provide coherent frequency hopped, psuedo-random bi-phase modulated waveforms. The FIG. 5 shows a supporting board or substrate 25 which contains $n$ switchable sequence generators (where $n$ is any positive integer). These sequence generators are identical to the sequence generator described and illustrated in FIG. 4. They consist of the tapped delay line 26, the input transducer 27, the switching network 28 and the phase inverter-summer 29. The inverter-summer 29 is the same circuit which is shown as summer 14 in FIG. 2. The delay line 26 is the same type delay line as shown in FIGS. 2 and 4. The switching network 28 contains both sets of switches, the shift register and reference code input are shown in greater detail in FIG. 4. The number $n$ of switchable sequence generators contained on the board is equal to the number of coherent frequencies desired. The number of taps on the delay line is equal to the number of bits desired in the sequence. There is a switchable sequence generator resonant for each of the desired coherent frequencies.

A pulse forming network 30 sends a pulse to the switching network 31 which routes the pulse to the input transducer $27a$–$n$ of the proper switchable sequence generator. The switch network 31 may be a parallel array of unidirectional linear gates of the type shown and described in chapter 17 of Millman and taub. This switch network 31 may also be a parallel array of RF switches which are commercially available from Relcom as type S–7C. The input transducers 27 A through N are the same as the input transducer shown in FIG. 1. As described above, the switchable sequence generator provides a pseudo-random, bi-phase modulated signal of frequency $f_n$ at the output of the appropriate summer $29a$–$n$. This signal is sent to the combiner 32 which supplies a single output port 33 for the n possible inputs. The combiner 32 is a hybrid power combiner which is commercially available as part no PD 40–55 from Merrimack Research.

Figure 6:
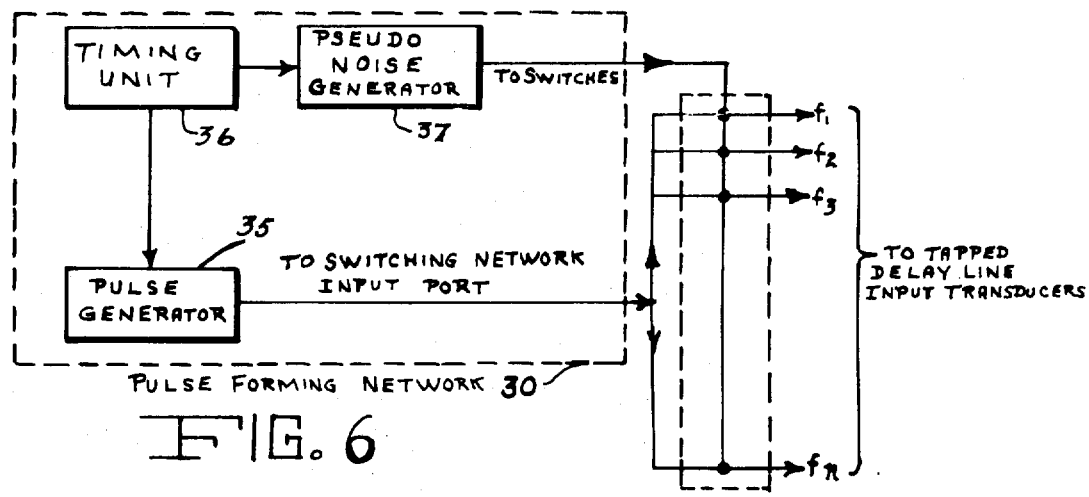
FIG. 6 is a block diagram of the pulse forming network and the switching network.

The pulse forming network 30 and the switching network 31 are expanded in FIG. 6. Referring now to FIG. 6, the pulse forming network 30 comprises a pulse generator 35, a timing unit 36 and a pseudo-noise generator 37.

Figure 7:
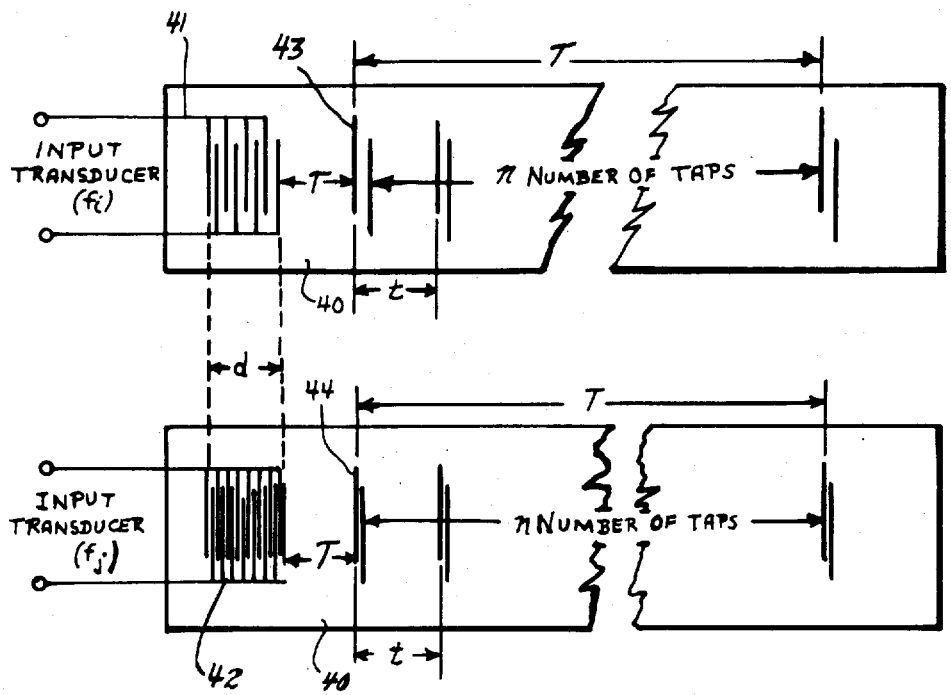
FIG. 7 is a further illustration of the sequence generator defining critical circuit parameters.

The timing unit 36 triggers the pulse generator 35 and the pseudo-noise generator 37. The pseudo-noise generator 37 sets up the switches 31, as indicated so that the only switch which is closed leads to the input transducer of the switchable sequence generator with the desired frequency. The pulse from the pulse generator 35 is, therefore, directed to this input transducer and, as previously described, a pseudo-random bi-phase modulated sequence is generated as the acoustic surface wave pulse travels down the tapped delay line. When the acoustic pulse strikes the final tap of the delay line, the last bit of the sequence is generated. The timing unit 36 triggers the pulse generator 35 and the pseudo-noise generator 37 again. The switches 31 are re-set by the pseudo-noise generator 37 so that the pulse from the pulse generator 35 is fed to that switchable sequence generator which is resonant at the new, desired frequency. In order that this process provide a continuous bit stream, the output from the first tap of the switchable sequence generator at the new frequency must follow immediately after the output from the last tap of the switchable sequence generator resonant at the previous frequency. This may be accomplished by making the delay through each switchable sequence generator equal. This is a condition which must be met since the bit rate must be a constant. Once the delays are made equal, the timing unit 36 can be made to trigger the pulse generator 35 at the proper time to insure bit continuity. The pulse generator 35 may be any commercially available pulse generator with an external trigger, for example a Hewlett-Packard Model No. 8004 A may be utilized. The timing unit 36 comprises a multivibrator of the type shown in FIG. 19–5 page 722 of Millman and Taub which supplies an output to a countdown circuit of the type shown and described in FIG. 18–1 page 668 of Millman and Taub. These circuits comprise the timing unit 36 with the output of the timing unit being the output of the countdown circuit. The pseudo notice generator 37 may be a reentrant shift register of the type shown in Section 9–13, page 346 of Millman and Taub. This generator 37 is also shown in FIG. 7.15 of the text entitled "Error correcting codes" by Peterson. To illustrate the process and describe construction of the switchable sequence generators, reference is made to FIG. 7.

Two of the sequence generators of FIG. 5 are shown in FIG. 7. The tapped delay lines only are shown and not the switching networks as illustrated in FIG. 4. The piezoelectric substrates 40 would be quartz. The input transducers 41 and 42 and the sets of taps 43 and 44 would be aluminum. This combination provides the weak coupling so as to perturb the surface wave as little as possible and reduces the mass loading on the substrate. One input transducer is resonant at $f_i$ and the other at $f_j$, which are two of the desired frequencies.

As noted above, an input transducer is made resonant at a particular frequency by constructing each finger one-quarter wavelength wide with one quarter wavelength spacing between fingers. The impulse response of the transducer will be an approximate sine wave with the number of cycles equal to the number of finger pairs. Thus, consider a transducer where $f$ = resonant frequency
$b$ = bit rate (bits/second)
$V_s$ = surface wave velocity
$\lambda$ = wavelength
$n_\lambda$ = number of $\lambda$'s per bit
then
$\lambda = V_s/f$ and $n_\lambda = f/b$ Thus, $n_\lambda$ gives the number of necessary finger pairs in the transducer with each finger $\lambda/4$ wide and spaced $\lambda/4$ from the next finger.
If we define
$d$ = length of transducer as in FIG. 7, then $d = \lambda \cdot n_\lambda = V_s/b$ Since both $V_s$ and $b$ are constants, the input transducers of all of the switchable sequence generators are of equal length. The only change from input transducer to input transducer are the number of fingers, finger width and finger spacing. At the higher frequencies, the number of fingers increases, but their width and spacing decrease so that the overall length and hence the bit rate remains constant. Turning again to FIG. 7, then $d$ is the same for both transducers. However, transducer 41 has $n_i = f_i/b$ finger pairs and transducer 42 has $n_j = f_j/b$ finger pairs.

If we have $n =$ no. bits in the sequence then there are $n$ taps on each delay line, as indicated in FIG. 7. The taps are placed so that the time delay, $\tau$, from the input transducer to the first tap is the same for all delay lines. For each series of taps, 43 and 44, $t$ is the time between taps and is given by $t = \lambda \cdot n_\lambda /V_s = 1/b$ This is the time delay between corresponding fingers of adjacent taps. Since there are $n$ number of taps on the delay line, then the overall delay T is given by $T = (n - 1) t = (n - 1)/b$ and, again this must be constant for all delay lines. Since the input transducer produces the proper number of wavelengths per bit, it is necessary to have one finger pair per tap.

It is now possible to determine the trigger repetition rate from the timing unit 36 to the pulse generator 35 (both shown in FIG. 6) to assure that the last bit from the last tap of frequency $f_i$ will be followed by the first bit from the first tap at frequency $f_j$. If this rate is defined as PRF then $PRF = 1/T = b/(n-1)$.

It may be that there are slight velocity differences between the substrates. Thus, the critical parameters are given in terms of time delays between points and not the distance between points. That is, the input transducers and taps must be laid down so that the three delays T, $t$, $\tau$ are respectively equal from one tapped delay line to another. The condition on the pulse of energy which is used to excite the surface wave is that its period must be less than or equal to the period of the highest frequency desired.

Figure 8:
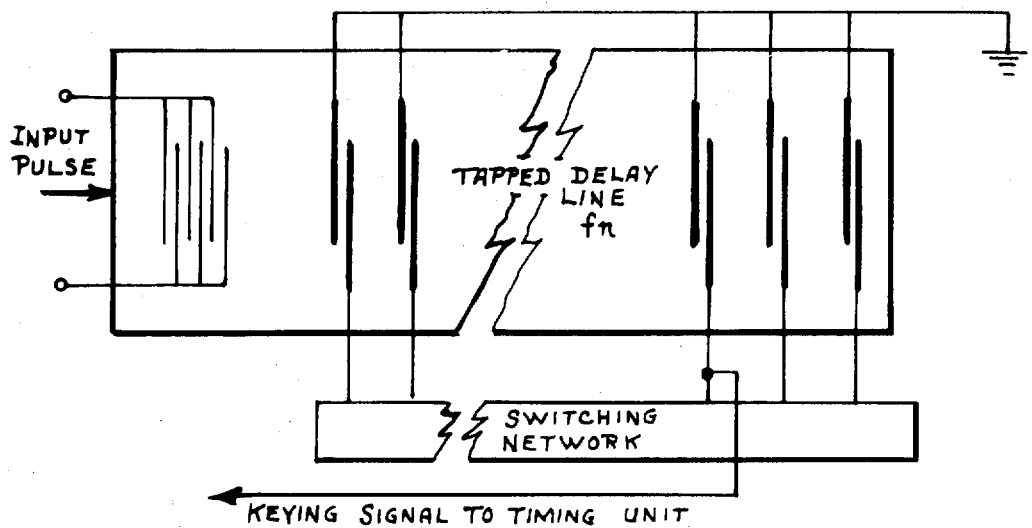
FIG. 8 is a block diagram of a compensation technique for the effects of ambient temperature changes; and, FIG. 9 is a block diagram illustrating an addition compensation technique for the effects of ambient temperature changes.
Figure 9:
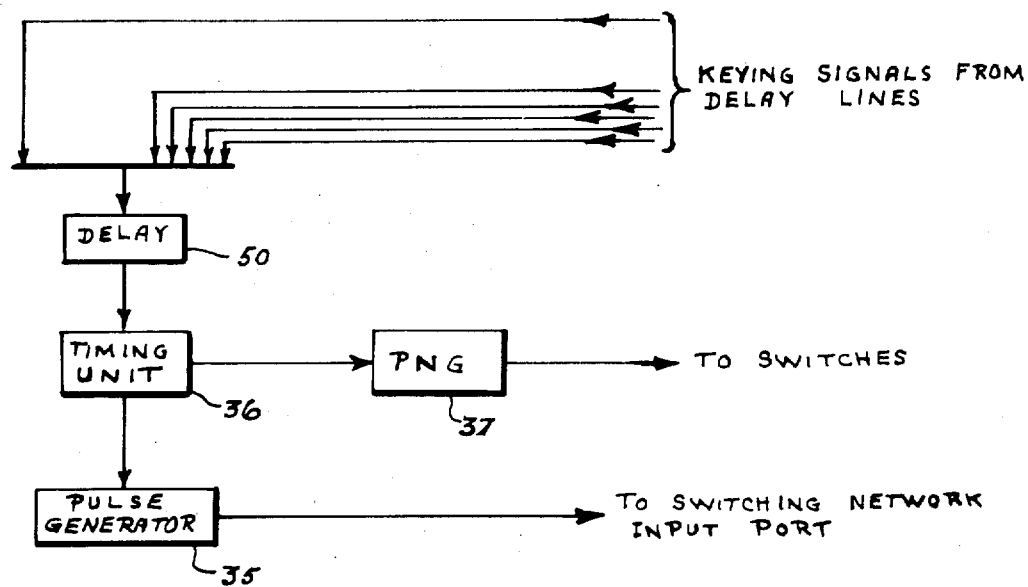

In order to compensate for the effects of ambient temperature changes the following techniques may be utilized. The devices could be placed in an oven whose temperature is maintained constant above room temperature. The substrates could be cut from zero-temperature dependent quartz. In such a cut, the changes in length are balanced by changes in velocity so that the time delay does not change with temperature. The third technique to be incorporated is illustrated in FIGS. 8 and 9. In essence, this technique uses a trigger signal, derived from one of the taps on the delay lines, to key the timing unit at the proper time for triggering the pulse generator. The same tap on each of the delay lines is used to provide the signal. The signals are all fed to a constant delay 50 as shown in FIG. 9 and its output is used to key the timing unit. The delay between taps is $t$. If the $m^{th}$ tap from the last is chosen to provide the keying signal, then the delay from this tap to the last tap is $(m-1)t$. The condition on $m$ is $(m-1)t > \tau$.

Since $t$, $\tau$ and $m$ are constant respectively from one tapped delay line to another, we can write $(m-1)t = \tau + K$ where K is the time delay of delay unit 50 in FIG. 9. The delay unit 50 comprises a diode detector, a Schmidt trigger and a monostable vibrator. The diode detector is merely a diode in combination with a low pass filter. The Schmidt detector is shown in FIG. 10–19 page 390 of Millman and Taub. The monostable vibrator is shown in FIG. 11–19 page 460 of Millman and Taub. The pulse generator cannot be run at a repetition rate of 1/T anymore because of the possible variations in T due to temperature. The keying signals from the taps allows for the possible variations in the delays and provides the proper triggering rate for the pulse generator.

The invention, as described above, has limitations as to the frequencies which can be generated. Acoustic surface wave devices are not usually operated below 10 MHz and only recently has propagation of Gigahertz frequencies been investigated. The normal range of operation is from 60 MHz to 300 MHz with the use of up-converting techniques to provide the desired rf frequencies.

The method for synthesizing frequencies which has been described above, satisfied the definition of coherence because the phase is always predictable, and another generator can be constructed so that a zero phase difference can be maintained between the two as the frequency is psuedo-randomly hopped. Of course, this requires that the hopping occur in synchronism which can be accomplished with a synchronization preamble and a matched filter on a set frequency.

The example given above, which has been utilized to describe the preferred form of the invention, has used only coded sequences which are bi-phase modulations of the carrier frequencies. It should be noted that quadri-phase coded sequences (i.e., sequences of 90° phase shifts) may also be generated by the invention techniques. The quadri-phase codes would employ the same surface wave portions described above but would require additional switching circuitry and phase inverters in the output sections of each generator.

While in accordance with the provisions of the statutes, we have illustrated and described the best forms of the invention now known to us, it will be apparent to those skilled in the art that changes may be made in the form of the apparatus disclosed without departing from the spirit of the invention as set forth in the appended claims, and that in some cases certain features of the invention may be used to advantage without a corresponding use of other features.

We claim:

1. A switchable acoustic surface wave sequence generator apparatus for generating a coherent frequency hopped, pseudo-random bi-phase modulated electromagnetic waveform comprising in combination:

a sequence generator unit having a plurality of sequence generators, said plurality of sequence generators providing an equal number of coherent frequencies, each of said plurality of sequence generators being resonant at a desired coherent frequency, a pulse forming network to generate an input pulse and a switch control signal, a switching unit connected to said pulse forming network to receive said input pulse and said switch control signal, said switch unit provides a plurality of output lines, said plurality of output lines are respectively connected to said plurality of sequence generators, said switch control signal controls said switching unit to provide an input pulse to only that sequence generator, of said plurality of sequence generators, being resonant at the desired frequency, and a combiner unit having a plurality of input ports connected to said plurality of sequence generators, said combiner unit receiving said coherent frequencies at said plurality of input ports, said combiner unit providing a single output port for said coherent frequencies.

2. A switchable sequence generator apparatus as described in claim 1 wherein said sequence generator comprises:

a piezoelectric substrate, an interdigital input transducer located at one end of said piezoelectric substrate, said input transducer having a predetermined number of finger pairs, an output transducer located at the other end of said piezoelectric substrate, said output transducer having a plurality of output taps, one side of each output tap is connected to ground, a switching network having a positive line and a negative line, the other side of each output tap is connected to said positive and negative line of said switching network, said negative line being connected to a phase inverter, a shift register is connected to said positive and negative line of said switching network, said shift register receives a reference code, said shift register sets the states of said switching network to correspond to the phase of the bit stored in said shift register, and, a summing network connected to said positive line of said switching network, said phase inverter of said negative line being connected to said summing network, said summing network providing an output, said output being a pseudo-random, phase modulated waveform.

3. A switchable sequence generator apparatus as described in claim 1 wherein said pulse forming network comprises:

a pulse generator to provide a series of pulses at a predetermined interval, a timing unit to trigger said pulse generator at a predetermined time interval, and a pseudo-noise generator to activate said switching unit, said switching unit connecting the desired pulse from said pulse generator to one of said sequence generators.

4. A switchable sequence generator apparatus as described in claim 2 further including a delay unit connected to one output tap of said plurality of output taps, said one output tap being the same in each sequence generator, said one output tap of each sequence generator thus providing keying signals to said delay unit, said delay unit provides a constant delay, said delay provides a delayed keyed signal to key said timing unit.

* * * * *